(12) United States Patent
Lo

(10) Patent No.: US 8,212,886 B2
(45) Date of Patent: Jul. 3, 2012

(54) INTERFACE CONVERTING CIRCUIT

(75) Inventor: Chung-Ming Lo, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 1149 days.

(21) Appl. No.: 12/045,918

(22) Filed: Mar. 11, 2008

(65) Prior Publication Data

US 2009/0040373 A1 Feb. 12, 2009

(30) Foreign Application Priority Data

Aug. 8, 2007 (TW) ............................... 96129271 A

(51) Int. Cl.
*H04N 7/01* (2006.01)
*H04N 5/228* (2006.01)

(52) U.S. Cl. .................. 348/222.1; 348/43; 348/448

(58) Field of Classification Search ............... 348/222.1, 348/441, 469, 458, 450, 556, 459, 43, 448
See application file for complete search history.

(56) References Cited

U.S. PATENT DOCUMENTS

| | | | |
|---|---|---|---|
| 6,580,461 B2* | 6/2003 | Chambers et al. ............ | 348/458 |
| 7,468,754 B2* | 12/2008 | Carlsgaard et al. ........... | 348/448 |
| 2006/0285010 A1* | 12/2006 | Wang et al. ................... | 348/452 |
| 2008/0211959 A1* | 9/2008 | Balram et al. ................ | 348/441 |
| 2011/0032331 A1* | 2/2011 | Chen et al. ..................... | 348/43 |
| 2011/0181691 A1* | 7/2011 | Chen et al. ..................... | 348/43 |

FOREIGN PATENT DOCUMENTS

| | | |
|---|---|---|
| CN | 2819683 Y | 9/2006 |
| JP | 2003189262 | 7/2003 |

* cited by examiner

*Primary Examiner* — Aung S Moe
(74) *Attorney, Agent, or Firm* — WPAT., P.C.; Justin King

(57) ABSTRACT

An interface converting circuit applied between a 3D de-interlace chip and a rear-end image compression chip. The interface converting circuit includes: a reducing FPS circuit, for dividing a first vertical synchronization signal to generate a second vertical synchronization signal, and converting a first horizontal synchronization signal to a second horizontal synchronization signal by masking the first horizontal synchronization signal according to the second vertical synchronization signal; a pixel clock multiplier, for multiplying a first pixel clock signal to generate a second pixel clock signal; and, a data-width converter, for converting an input signal with M bits data width, which is transmitted at a frequency of the first pixel clock signal by the 3D de-interlace chip, to an output signal with M/2 bits data width, which is transmitted at a frequency of the second pixel clock signal.

19 Claims, 7 Drawing Sheets

INTERFACE CONVERTING CIRCUIT

FIELD OF THE INVENTION

The present invention relates to an interface converting circuit, and more particularly to an interface converting circuit applied between a 3D de-interlace chip and a rear-end image compression chip.

BACKGROUND OF THE INVENTION

FIG. 1 is a block diagram showing a conventional image processing system of an IP CAM. The IP CAM image processing system comprises: an image-capturing module 10 and a rear-end image compression chip 14. The image-capturing module 10 further comprises a charge coupled device (CCD) and a digital signal processor (not shown).

When the CCD of the image-capturing module 10 is capturing an object, the capturing signals, generated by the CCD, is transmitted to the digital signal processor. The capturing signals are then transferred to pixel-format signals (i.e., resolution 720×480) by the digital signal processor. The digital signal processor then sequentially outputs an odd-field signal (resolution 720×240) and an even-field signal (resolution 720×240) according to the transferred pixel-format signals, wherein the odd-field signal is defined as the odd scanning lines of the CCD transmitted to the digital signal processor, and the even-field signal is defined as the even scanning lines of the CCD transmitted to the digital signal processor. The odd-field signal and the even-field signal derived from the image-capturing module 10 are then received and mixed to a complete frame (resolution 720×480) by the rear-end image compression chip 14 (i.e., MPEG-4/H.264 encoder). The generated frame is then further encoded and compressed by the rear-end image compression chip 14.

The above-mentioned process in the image processing system is further explained in detail through the image-capturing module 10 capturing a still object (resolution 10×8) depicted in FIG. 2. At time point t1, the capturing signals transmitted by the CCD are converted to a pixel-format signal by the digital signal processor, and the odd-field signal is generated by the digital signal processor. At time point t2, the capturing signals transmitted by the CCD are converted to a pixel-format signal by the digital signal processor, and the even-field signal is generated by the digital signal processor. FIG. 3A shows an odd-field signal (resolution 10×4), which is constituted by odd scanning lines (scanning lines 1, 3, 5, 7). FIG. 3B shows an even-field signal (resolution 10×4), which is constituted by even scanning lines (scanning lines 2, 4, 6, 8).

After the odd-field signal (resolution 10×4, depicted in FIG. 3A) and the even-field signal (resolution 10×4, depicted in FIG. 3B) are sequentially received by the rear-end image compression chip 14 at time point t1 and t2, respectively, the odd-field signal and the even-field signal are then mixed to a complete frame (resolution 10×8, depicted in FIG. 3C), and the rear-end image compression chip 14 further encodes and compresses the complete frame. Generally, the image-capturing module 10 outputs the odd-field signal and the even-field signal with the same frame rate of 30 frames per second (30 FPS).

However, if the object depicted in FIG. 2 is moving at a relatively high speed and is captured by the image-capturing module 10, a saw tooth type edge distortion may be resulted in due to each complete frame is mixed by two field signals. For example, an odd-field signal (resolution 10×4, depicted in FIG. 4A) is derived from the image-capturing module 10 at time point t1; and an even-field signal (resolution 10×4, depicted in FIG. 4B) is derived from the image-capturing module 10 at time point t2. Obviously, the saw tooth type edge distortion is occurred in the complete frame (resolution 10×8, depicted in FIG. 4C) if the odd-filed signal (depicted in FIG. 4A) and the even-field signal (depicted in FIG. 4B) are mixed (or interlaced) to a complete frame.

The saw tooth type edge distortion, resulted from an interlace CCD scanning a fast-moving object, can be avoided by introducing a 3D de-interlace chip in the image processing system. Instead of mixing the odd-filed signal and the even-field signal, the image processing system with the 3D de-interlace chip generates a complete frame through executing dynamic prediction compensation to each odd-filed signal and each even-field signal. In another word, when the odd-field signal (resolution 720×240) is generated at time point t1, the 3D de-interlace chip generates a complete frame (resolution 720×480) through executing the dynamic prediction compensation to the odd-field signal. Accordingly, when the even-field signal (resolution 720×240) is generated at time point t2, the 3D de-interlace chip generates another complete frame (resolution 720×480) through executing the dynamic prediction compensation to the even-field signal. Obviously, in the image processing system with the 3D de-interlace chip, not only the saw tooth type edge distortion resulted from the mixing procedure is avoided, but also the number of the generated frames is doubled.

Because the 3D de-interlace chip is originally designed for applying to LCDTV (Liquid Crystal Display TV) not for applying to the IP CAM, the output specification of the 3D de-interlace chip must be compatible of the input specification of the LCDTV. In another word, the 3D de-interlace chip is designed to output data with 16 bits data width and output data with a frame rate of 60 frames per second (60 FPS). However, the input specification of the rear-end image compression chip (i.e., MPEG-4/H.264 encoder) is designed to receive 8 bits data width and receives data with a frame rate of 30 frames per second (30 FPS). Therefore, designing an interface converting circuit for the compatibility between the 3D de-interlace chip and the rear-end image compression chip is the main purpose of the present invention.

SUMMARY OF THE INVENTION

The object of the present invention is to provide an interface converting circuit for the compatibility between the 3D de-interlace chip and the rear-end image compression chip The present invention provides an interface converting circuit, applied between a 3D de-interlace chip and a rear-end image compression chip, comprising: a reducing FPS circuit, for dividing a first vertical synchronization signal to generate a second vertical synchronization signal, and converting a first horizontal synchronization signal to a second horizontal synchronization signal by masking the first horizontal synchronization signal according to the second vertical synchronization signal; a pixel clock multiplier, for multiplying a first pixel clock signal to generate a second pixel clock signal; and, a data-width converter, for converting an input signal with M bits data width, which is transmitted at a frequency of the first pixel clock signal by the 3D de-interlace chip, to an output signal with M/2 bits data width, which is transmitted at a frequency of the second pixel clock signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
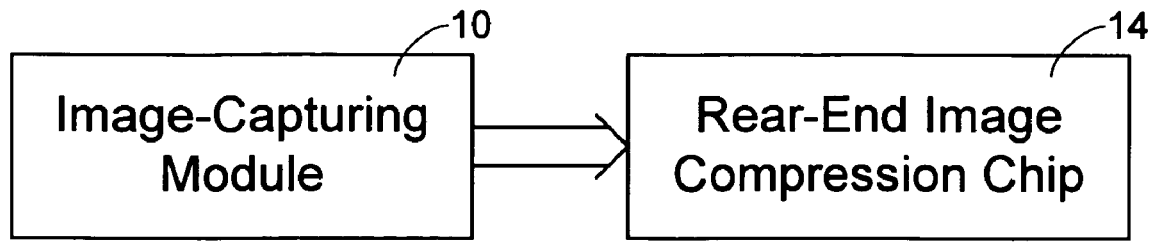
FIG. 1 is a block diagram showing a conventional image processing system of an IP CAM.
Figure 2:
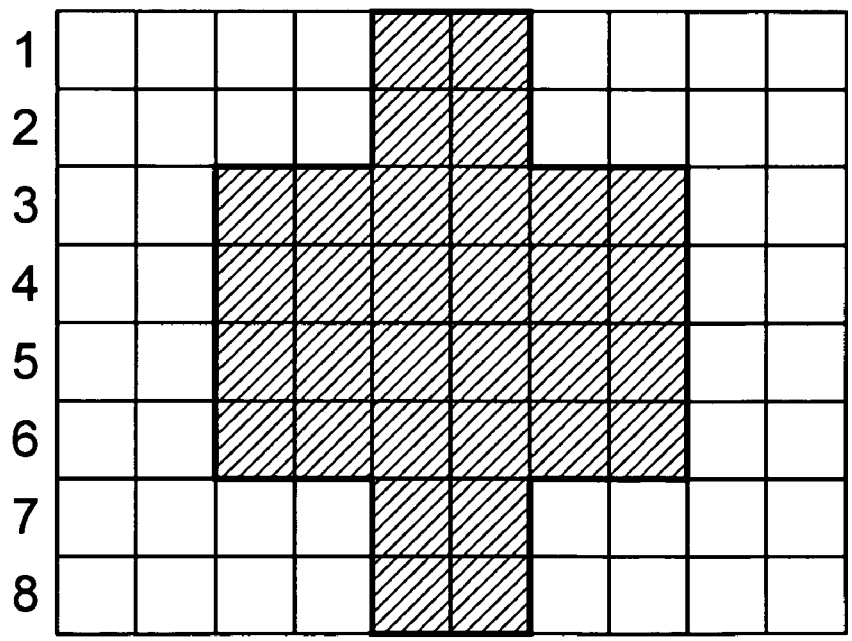
FIG. 2 illustrates a still object captured by CCD.
Figure 3A:
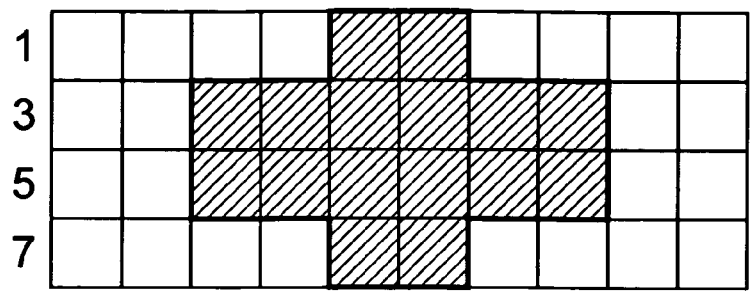
FIG. 3A shows an odd-field signal of FIG. 2.
Figure 3B:
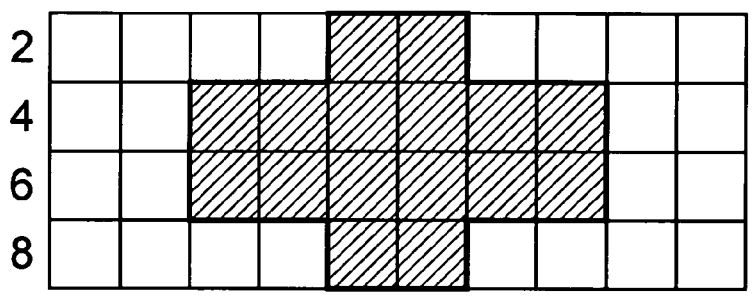
FIG. 3B shows an even-field signal of FIG. 2.
Figure 3C:
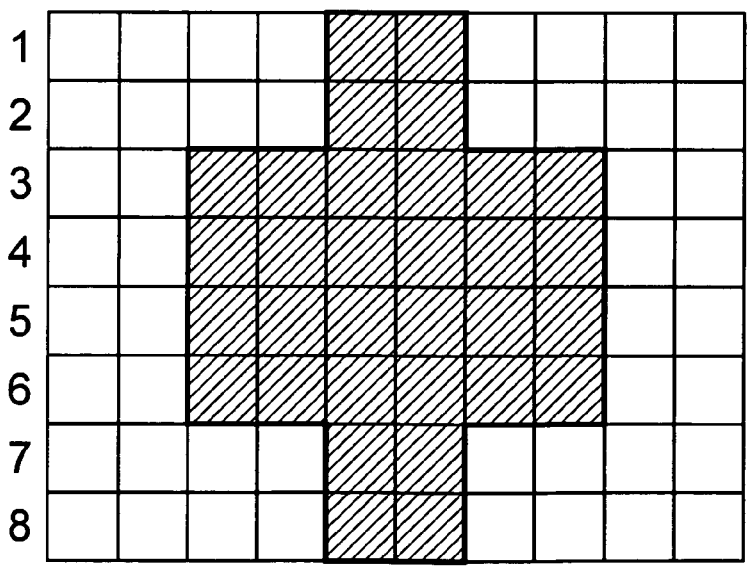
FIG. 3C shows a complete frame.
Figure 4A:
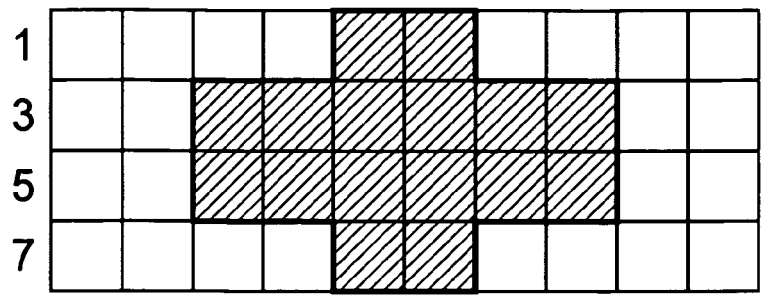
FIG. 4A shows an odd-field signal of a moving object.
Figure 4B:
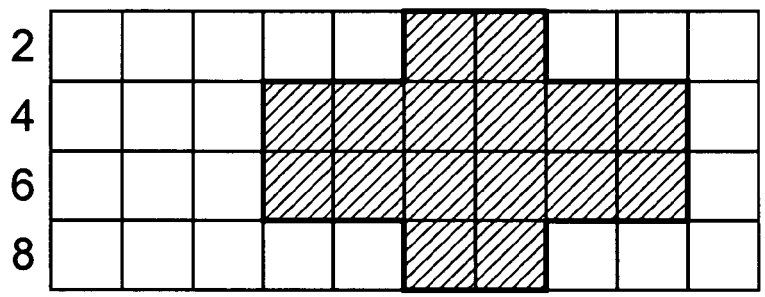
FIG. 4B shows an even-field signal of the moving object.
Figure 4C:
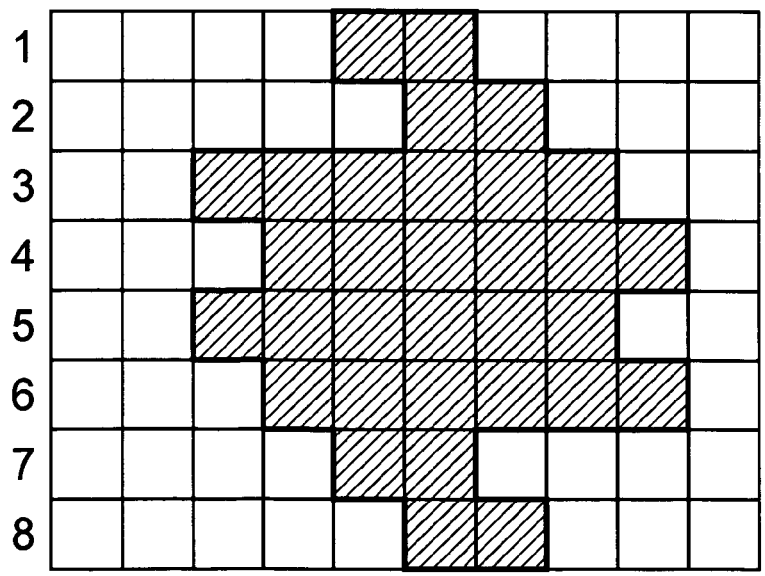
FIG. 4C shows a combination frame of the odd-field signal and the even field signal.
Figure 5:
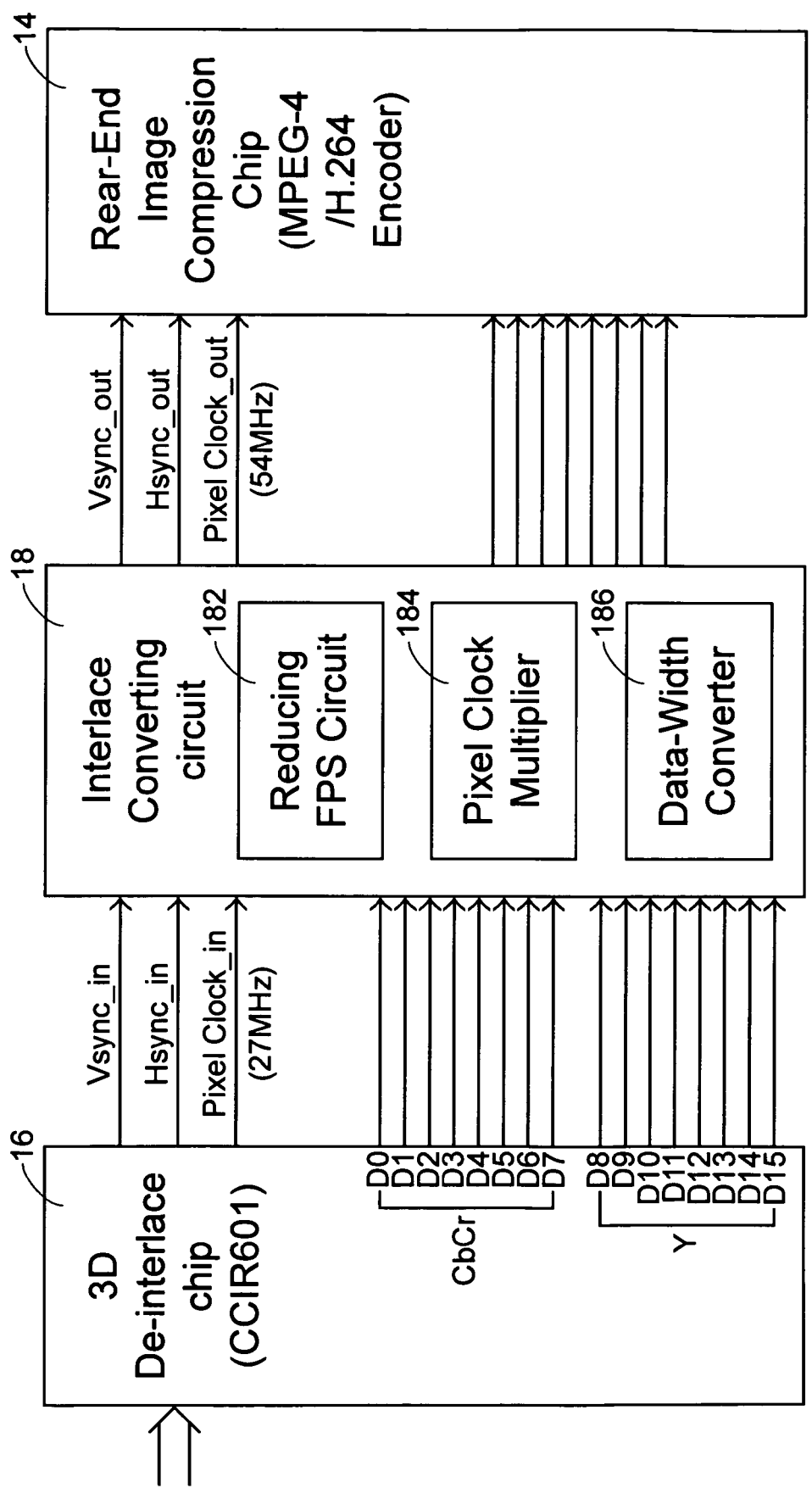
FIG. 5 is a block diagram showing an image processing system.

FIG. 5 is a block diagram showing an image processing system. The image processing system comprises: a 3D de-interlace chip 16 (CCIR601 specification), a rear-end image compression chip 14 (i.e., MPEG-4/H.264 encoder), and an interface converting circuit 18 of the present invention. The interface converting circuit 18 further comprises: a reducing FPS circuit 182, a pixel clock multiplier 184, and a data-width converter 186.

As depicted in FIG. 5, after the 3D de-interlace chip 16 receiving the odd-field signal and the even-field signal derived from the image-capturing module 10 with a frame rate of 30 frames per second (30 FPS), the 3D de-interlace chip 16 then generates frames with a frame rate of 60 frames per second (60 FPS) through executing the dynamic prediction compensation to each odd-filed signal and each even-field signal, these frames, constituted by Y, Cb, Cr signals, are further transmitted to the interface converting circuit 18 of the present invention with 16 bits data width; wherein data width of Y signal:data width of Cb signal:data width of Cr signal=4:2:2. In the embodiment of the present invention, the CbCr signal is transmitted from the lower eight bits [D0:D7], and the Y signal is transmitted from the higher eight bits [D8:D15]. Moreover, according to the output specification of the 3D de-interlace chip 16 (CCIR601 specification), an inputted vertical synchronization signal (Vsync_in), an inputted horizontal synchronization signal (Hsync_in), and an inputted pixel clock signal (PixelClock_in) are also derived from the 3D de-interlace chip 16. The frequency of the inputted vertical synchronization signal (Vsync_in) is 60 Hz standing for the 3D de-interlace chip 16 to transmit 60 frames per second (60 FPS). The inputted horizontal synchronization signal (Hsync_in) stands for the number of the horizontal-scanning lines contained in each image. For example, the frequency of the horizontal synchronization signal (Hsync_in) is 28800 (60×480) Hz if an image is with a resolution 720×480. The inputted pixel clock signal (PixelClock_in) stands for the sample numbers in each scanning line. In the embodiment, the frequency of the inputted pixel clock signal (PixelClock_in) is 27 MHz.

Because the 3D de-interlace chip 16 (CCIR601 specification) can output frames with a frame rate of 60 FPS but the rear-end image compression chip 14 (MPEG-4/H.264 encoder) can only receives frames with a frame rate of 30 FPS, the main function of the reducing FPS circuit 182 in the interface converting circuit 18 of the present invention is to reduce the frame rate of the 3D de-interlace chip 16 (CCIR601 specification) from 60 FPS to 30 FPS.

Figure 6:
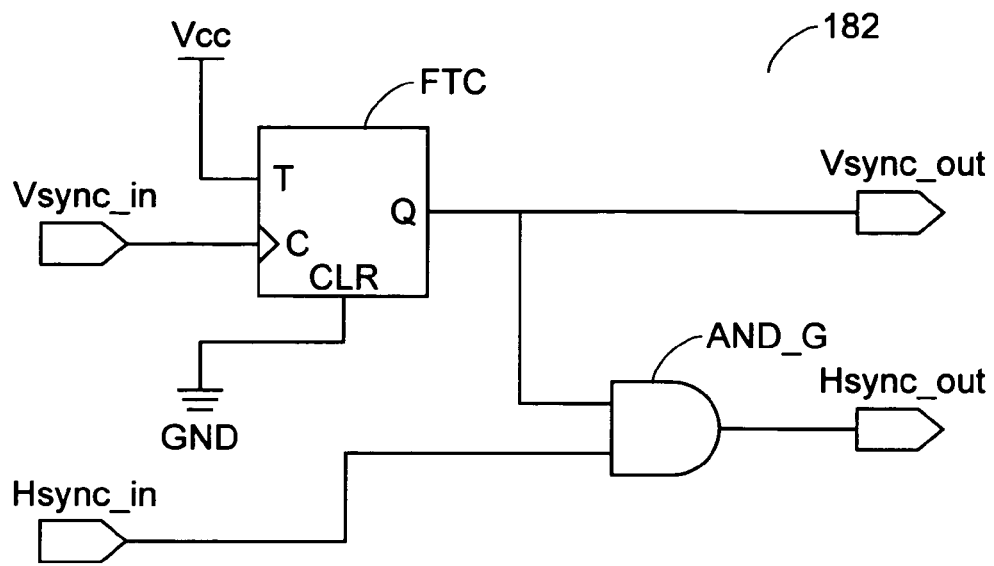
FIG. 6 is a schematic diagram showing a circuit configuration of the reducing FPS circuit.

FIG. 6 is a schematic diagram showing a circuit configuration of the reducing FPS circuit 182 in the interface converting circuit 18 of the present invention. The reducing FPS circuit 182 comprises: a T-type Flip-Flop (FTC) and an AND gate (AND_G). In the reducing FPS circuit 182, a data-input terminal (T) of the T-type Flip-Flop (FTC) is connected to a voltage source (Vcc); a clock terminal (C) of the T-type Flip-Flop (FTC) serves to receive the inputted vertical synchronization signal (Vsync_in) which is derived from the 3D de-interlace chip 16; a clear terminal (CLR) of the T-type Flip-Flop (FTC) is connected to ground (GND); a first input terminal of the AND gate (AND_G) is connected to a data output terminal (Q) of the T-type Flip-Flop (FTC), a second input terminal of the AND gate (AND_G) serves to receive the inputted horizontal synchronization signal (Hsync_in) which is derived from the 3D de-interlace chip 16.

As depicted in FIG. 6, because the data input terminal (T) of the T-type Flip-Flop (FTC) is connected to a high-level (Vcc) and the clear terminal (CLR) of the T-type Flip-Flop (FTC) is connected to a low-level (GND), the output terminal (Q) of the T-type Flip-Flop (FTC) can change its level at the rising edges of the inputted vertical synchronization signal (Vsync_in). That means the inputted vertical synchronization signal (Vsync_in) is divided by two to generate the outputted vertical synchronization signal (Vsync_out).

Figure 7A:
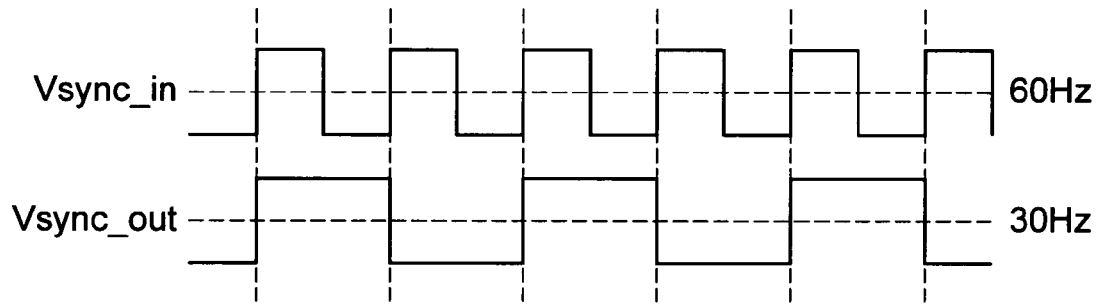
FIG. 7A is a timing diagram showing the relationship of Vsync_in and Vsync_out.

FIG. 7A is a timing diagram showing the relationship of inputted vertical synchronization signal (Vsync_in) and the outputted vertical synchronization signal (Vsync_out). The frequency of the inputted vertical synchronization signal (Vsync_in) is 60 Hz and the outputted vertical synchronization signal (Vsync_out) is 30 Hz.

Figure 7B:
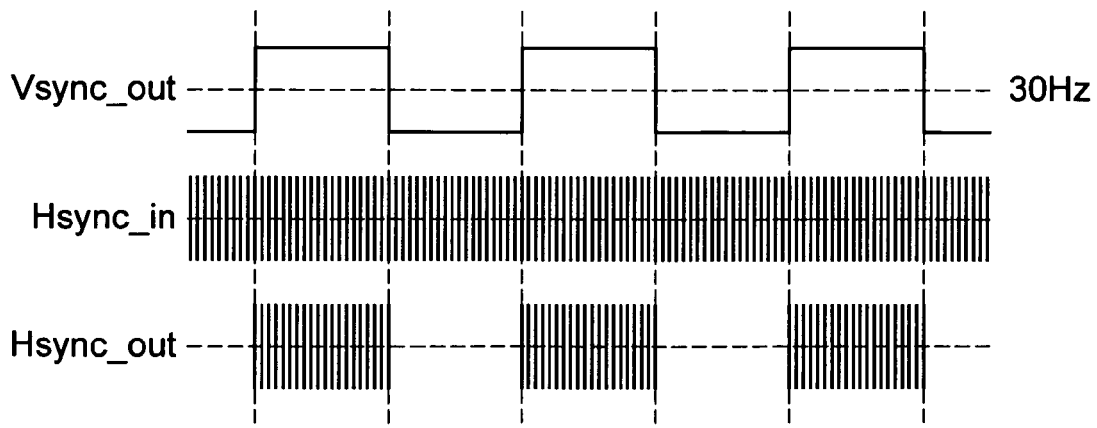
FIG. 7B is a timing diagram showing the relationships of the Vsync_in, Hsync_in, and Hsync_out.

FIG. 7B is a timing diagram showing the relationships of the outputted vertical synchronization signal Vsync_out, the inputted horizontal synchronization signal (Hsync_in), and the outputted horizontal synchronization signal (Hsync_out). Because the outputted vertical synchronization signal (Vsync_out) and the inputted horizontal synchronization signal (Hsync_in) are received by the AND gate (AND_G), the outputted horizontal synchronization signal (Hsync_out) is generated by masking half pulses of the inputted horizontal synchronization signal (Hsync_in) and derived from the output terminal of the AND gate (AND_G).

Furthermore, in the 3D de-interlace chip 16 (CCIR601 specification), the pixel clock is 27 MHz and the output data width is 16 bits. However, the rear-end image compression chip 14 (i.e., MPEG-4/H.264 encoder) can only receive data with 8 bits width. Therefore, for achieving the real-time performance, the pixel clock multiplier 184 has to increase the pixel clock (54 MHz) and the data-width converter 186 has to decrease the 16 bits data width to the 8 bits data width, so as the data derived from the 3D de-interlace chip 16 (CCIR601 specification) can be completely processed by the rear-end image compression chip 14 (i.e., MPEG-4/H.264 encoder) in time.

Figure 8:
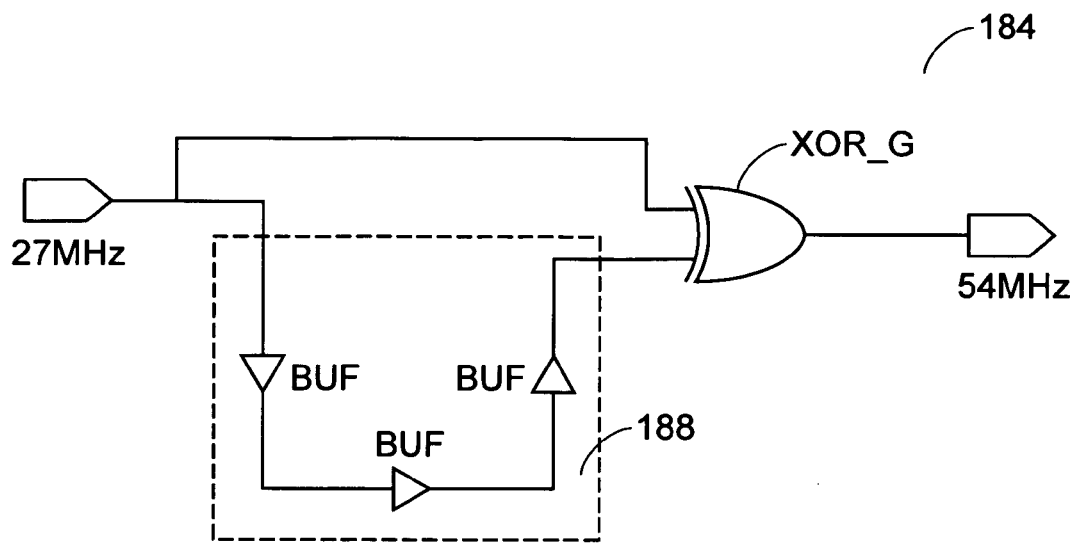
FIG. 8 is a schematic diagram showing the circuit configuration of the pixel clock multiplier.
Figure 9:
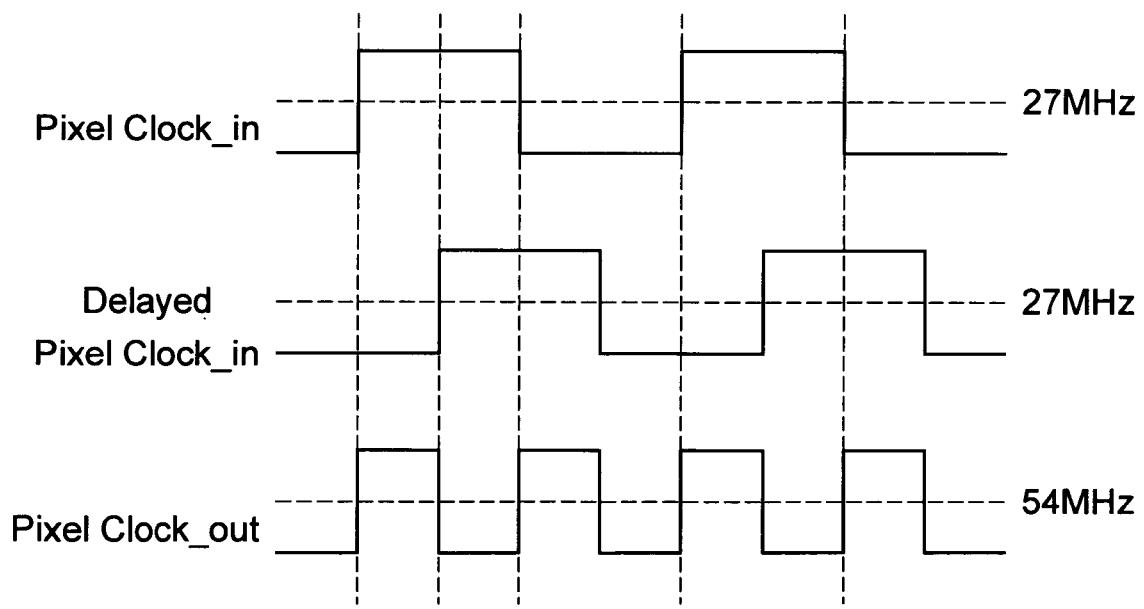
FIG. 9 is a timing diagram showing the relationships of the PixelClock_in, the delayed pixel clock signal, and the outputted pixel clock signal an inputted pixel clock signal (PixelClock_out)

FIG. 8 is a schematic diagram showing the circuit configuration of the pixel clock multiplier 184 in the interface converting circuit 18 of the present invention. The pixel clock multiplier 184 comprises: a XOR gate (XOR_G) and a delay component 188. In the pixel clock multiplier 184, the inputted pixel clock signal (PixelClock_in) with 27 MHz derived from the 3D de-interlace chip 16 is derived to a first input terminal of the XOR gate (XOR_G) and an input terminal of the delay component 188; an output terminal of the delay component 188 is connected to a second input terminal of the XOR gate (XOR_G); the delay component 188, constituted by a plurality of buffers (BUF) coupled in series, serves to delay the inputted pixel clock signal (PixelClock_in) ¼ clock cycle. FIG. 9 is a timing diagram showing the relationships of the inputted pixel clock signal (PixelClock_in), the delayed pixel clock signal, and the outputted pixel clock signal (PixelClock_out) derived from the XOR gate (XOR_G). As depicted in FIG. 9, the frequency of the pixel clock signal (27 MHz) derived to the pixel clock multiplier 184 is doubled to 54 MHz and derived from the output terminal of the XOR gate (XOR_G).

Figure 10:
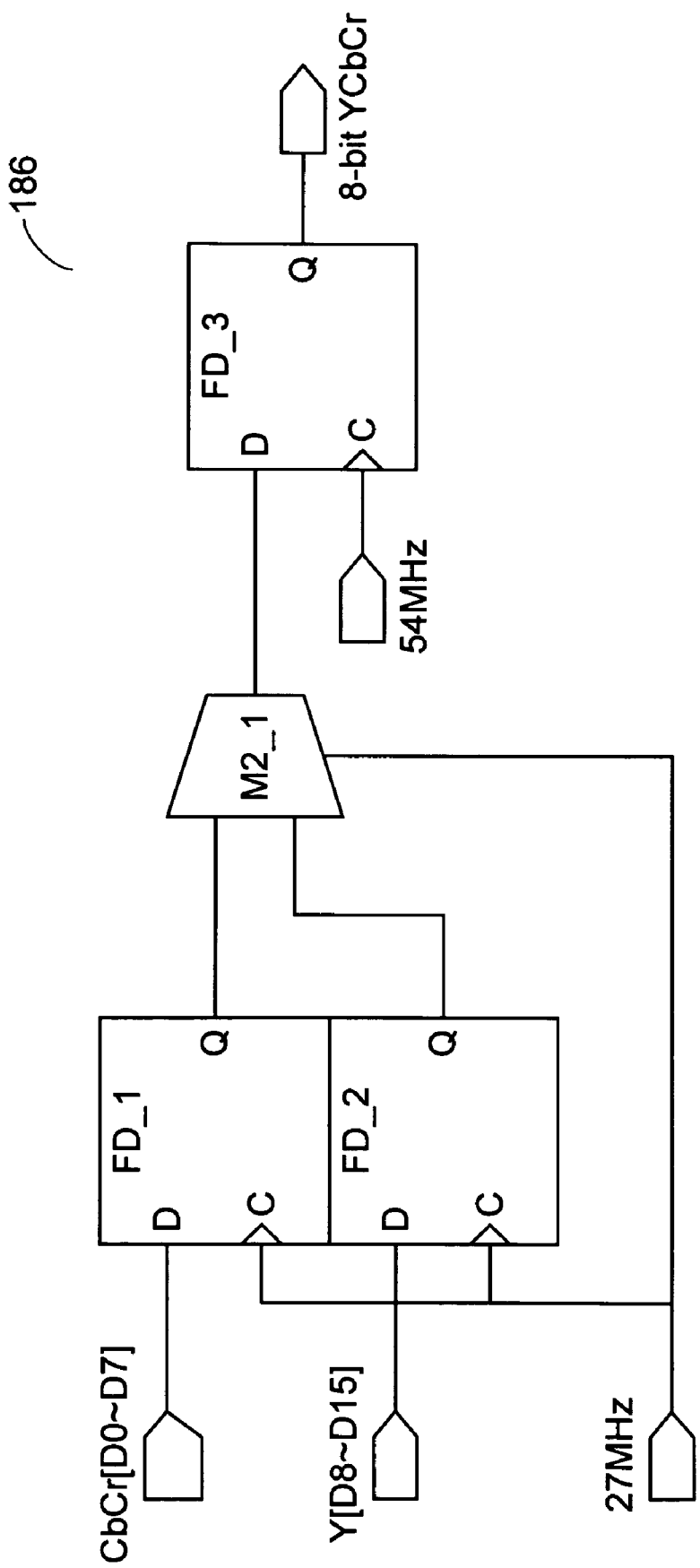
FIG. 10 is a schematic diagram showing the circuit configuration of the data-width converter.

FIG. 10 is a schematic diagram showing the circuit configuration of the data-width converter 186. The data-width converter 186 comprises: a first D-type Flip-Flop (FD_1), a second D-type Flip-Flop (FD_2), a third D-type Flip-Flop (FD_3), and a multiplexer (M2_1). In the data-width converter 186, a data input terminal (D) of the first D-type Flip-Flop (FD_1) serves to receive lower eight bits data (8-bit CbCr signal [D0:D7]); a clock terminal (C) of the first D-type Flip-Flop (FD_1) serves to receive the inputted pixel clock signal (PixelClock_in, 27 MHz); a data input terminal (D) of the second D-type Flip-Flop (FD_2) serves to receive higher eight bits data (8-bit Y signal [D8:D15]); a clock terminal (C) of the second D-type Flip-Flop (FD_2) serves to receive the inputted pixel clock signal (PixelClock_in, 27 MHz); a first input terminal of the multiplexer (M2_1) is connected to an output terminal (Q) of the first D-type Flip-Flop (FD_1); a second input terminal of the multiplexer (M2_1) is connected to an output terminal (Q) of the second D-type Flip-Flop (FD_2); a selection terminal of the multiplexer (C) serves to receive the inputted pixel clock signal (PixelClock_in, 27 MHz); a data input terminal (D) of the third D-type Flip-Flop (FD_3) is connected to an output terminal of the multiplexer (M2_1); and a clock terminal (C) of the third D-type Flip-Flop (FD_3) serves to receive the outputted pixel clock signal (PixelClock_out, 54 MHz).

Firstly, when the inputted pixel clock signal (PixelClock_in, 27 MHz) is converting from a low-level to a high-level (rising edge), the lower eight bits data (8-bit CbCr signal [D0:D7]) and the higher eight bits data (8-bit Y signal [D8:D15]) are transmitted to the output terminal (Q) of the first D-type Flip-Flop (FD_1) and the output terminal (Q) of the second D-type Flip-Flop (FD_2), respectively. In the embodiment of the present invention, the lower eight bits data (8-bit CbCr signal [D0:D7]) is further transmitted to the output terminal of the multiplexer (M2_1) and received by the third D-type Flip-Flop (FD_3) when the inputted pixel clock signal (PixelClock_in, 27 MHz) is at the high-level. Alternatively, the higher eight bits data (8-bit Y signal [D8:D15]) is further transmitted to the output terminal of the multiplexer (M2_1) and received by the third D-type Flip-Flop (FD_3) when the inputted pixel clock signal (PixelClock_in, 27 MHz) is at the low-level. In another word, the lower eight bits data (8-bit CbCr signal [D0:D7]) and the higher eight bits data (8-bit Y signal [D0:D7]) are sequentially derived to the data input terminal (D) of the third Flip-Flop (FD_3) in one cycle of the inputted pixel clock signal (PixelClock_in). The lower eight bits data (8-bit CbCr signal [D0:D7]) is further derived from the output terminal (Q) of the third Flip-Flop (FD_3) at the first rising edge of the outputted pixel clock signal (PixelClock_out, 54 MHz). Accordingly, the higher eight bits data (8-bit Y signal [D8:D15]) is further derived from the output terminal (Q) of the third Flip-Flop (FD_3) at the second rising edge of the outputted pixel clock signal (PixelClock_out, 54 MHz). In this way, the lower eight bits data (8-bit CbCr signal [D0:D7]) and the higher eight bits data (8-bit Y signal [D0:D7]) are sequentially derived from the output terminal (Q) of the third Flip-Flop (FD_3) in two cycles of the outputted pixel clock signal (PixelClock_out). Obviously, all the data derived from the 3D de-interlace chip 16 can be guaranteed to be delivered to the rear-end image compression chip 14 (i.e., MPEG-4/H.264 encoder) in time, so as the real-time performance can be achieved.

Therefore, the incompatible problem between the signals derived from the 3D de-interlace chip 16 (16 bits data width, 60 FPS) and the signals derived in the rear-end image compression chip 14 (8 bits data width, 30 FPS) can be solved by the interface converting circuit 18 of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interface converting circuit, applied between a 3D de-interlace chip and a rear-end image compression chip, comprising:
   a reducing FPS circuit, for dividing a first vertical synchronization signal to generate a second vertical synchronization signal, and converting a first horizontal synchronization signal to a second horizontal synchronization signal by masking the first horizontal synchronization signal according to the second vertical synchronization signal;
   a pixel clock multiplier, for multiplying a first pixel clock signal to generate a second pixel clock signal; and
   a data-width converter, for converting an input signal with M bits data width, which is transmitted at a frequency of the first pixel clock signal by the 3D de-interlace chip, to an output signal with M/2 bits data width, which is transmitted at a frequency of the second pixel clock signal.

2. The interface converting circuit according to claim 1, wherein the reducing FPS circuit further comprises: a T-type Flip-Flop and an AND gate; wherein a data-input terminal of the T-type Flip-Flop is connected to a voltage source; a clock terminal of the T-type Flip-Flop receives the first vertical synchronization signal; a data-output terminal of the T-type Flip-Flop outputs the second vertical synchronization signal; a clear terminal of the T-type Flip-Flop is connected to a ground; a first input terminal of the AND gate is connected to the data-output terminal of the T-type Flip-Flop; a second input terminal of the AND gate receives the first horizontal synchronization signal; and an output terminal of the AND gate outputs the second horizontal synchronization signal.

3. The interface converting circuit according to claim 1, wherein the pixel clock multiplier further comprises: a XOR gate and a delay component; wherein a first input terminal of the XOR gate receives the first pixel clock signal; an output terminal of the XOR gate outputs the second pixel clock signal; an input terminal of the delay component receives the first pixel clock signal; and an output terminal of the delay component is connected to a second input terminal of the XOR gate.

4. The interface converting circuit according to claim 3, wherein the delay component is constituted by a plurality of buffers coupled in series.

5. The interface converting circuit according to claim 3, wherein a signal outputted by the delay component is delayed by ¼ clock cycle of the first pixel clock signal.

6. The interface converting circuit according to claim 1, wherein the data-width converter further comprises: a first D-type Flip-Flop, a second D-type Flip-Flop, a third D-type Hip-Flop, and a multiplexer; wherein a data input terminal of the first D-type Flip-Flop receives lower portion of M bits data; a clock terminal of the first D-type Flip-Flop receives the first pixel clock signal; a data input terminal of the second D-type Flip-Flop receives higher portion of M bits data; a clock terminal of the second D-type Flip-Flop receives the first pixel clock signal; a first input terminal of the multiplexer is connected to an output terminal of the first D-type Flip-Flop; a second input terminal of the multiplexer is connected to an output terminal of the second D-type Flip-Flop; a selection terminal of the multiplexer receives the first pixel clock signal; a data input terminal of the third D-type Flip-Flop is connected to an output terminal of the multiplexer; a clock terminal of the third D-type Flip-Flop receives the second pixel clock signal; and an output terminal of the third D-type Flip-Flop serves to output the output data.

7. The interface converting circuit according to claim 6, wherein the multiplexer outputs the lower portion data when the first pixel clock signal is at a first level, and the multiplexer outputs the higher portion data when the first pixel clock signal is at a second level.

8. The interface converting circuit according to claim 1, wherein the 3D de-interlace chip adopts a CCIR601 specification.

9. The interface converting circuit according to claim 1, wherein the rear-end image compression chip is an MPEG-4/H.264 encoder.

10. The interface converting circuit according to claim 1, wherein the frequency of the first vertical synchronization signal is 60 Hz, and the frequency of the second vertical synchronization signal is 30 Hz.

11. The interface converting circuit according to claim 1, wherein the second vertical synchronization signal and the first horizontal synchronization signal are respectively connected to two input terminals of an AND gate, thereby the second horizontal synchronization signal is derived from the output terminal of the AND gate, wherein the second horizontal synchronization signal is activated when the second vertical synchronization signal is enable.

12. The interface converting circuit according to claim 1, wherein the frequency of the first pixel clock signal is 27 MHz, the frequency of the second pixel clock signal is 54 MHz.

13. The interface converting circuit according to claim 1, wherein the value of M is 16.

14. The interface converting circuit according to claim 1, wherein the input data with M bits data width is divided to a lower portion of M/2 bits data and a higher portion of M/2 bits data.

15. The interface converting circuit according to claim 14, wherein the lower M/2 bits data is a CbCr signal, and the higher M/2 bits data is a Y signal.

16. The interface converting circuit according to claim 14, wherein the higher M/2 bits data is a CbCr signal, and the lower M/2 bits data is a Y signal.

17. The interface converting circuit according to claim 1, wherein the first vertical synchronization signal and the first horizontal synchronization signal are derived from the 3D de-interlace chip to the reducing FPS circuit, and the second vertical synchronization signal and the second horizontal synchronization signal are derived from the reducing FPS circuit to the rear-end image compression chip.

18. The interface converting circuit according to claim 1, wherein the first pixel clock signal is derived from the 3D de-interlace chip to the pixel clock multiplier, and the second pixel clock signal is derived from the pixel clock multiplier to the rear-end image compression chip.

19. The interface converting circuit according to claim 1, wherein the input data with M bits data width is derived from the 3D de-interlace chip to the data-width converter, the output data with M/2 bits data width is derived from the data-width converter to the rear-end image compression chip.

* * * * *